Nov. 12, 1935.  L. W. STETSON  2,020,586
ANTISKID DEVICE FOR WHEEL TREADS
Original Filed July 11, 1929
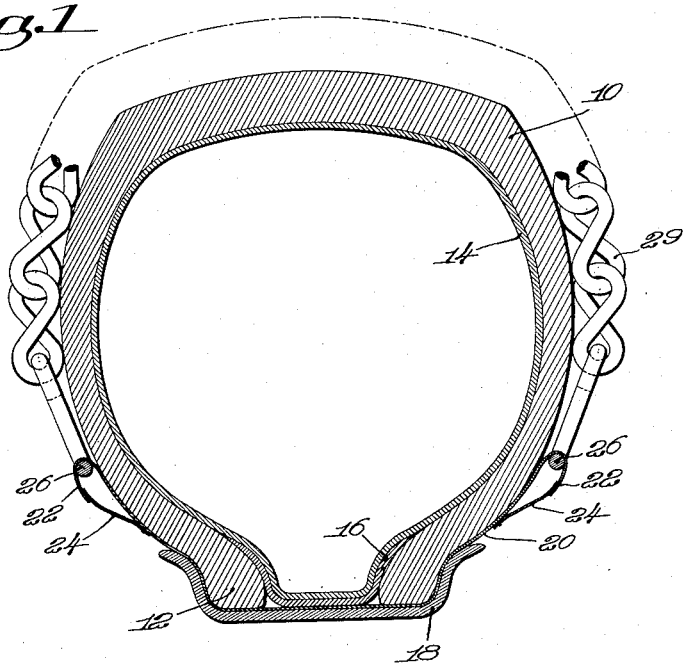
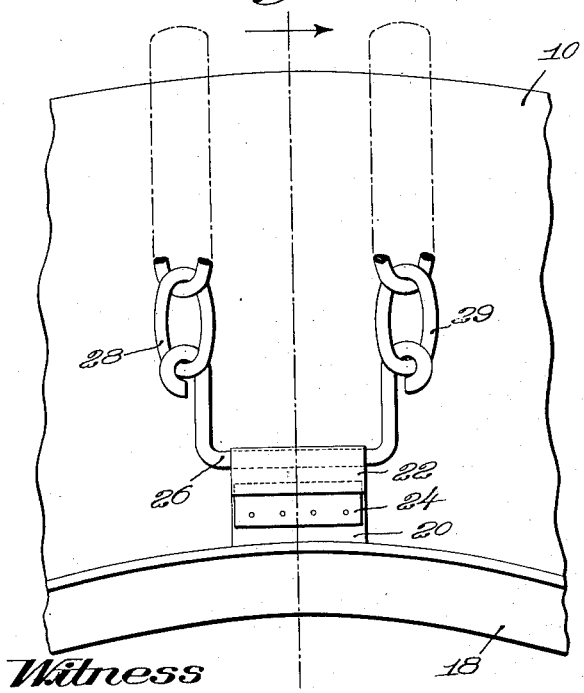
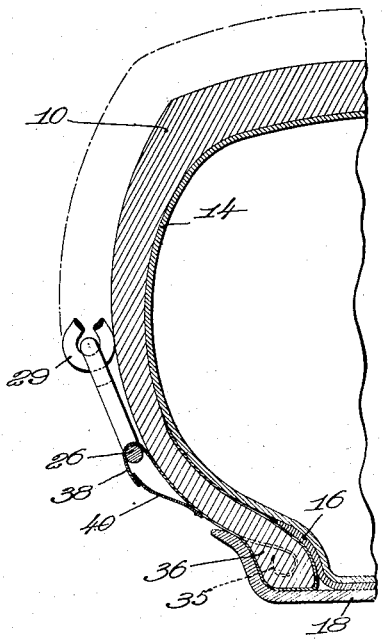

Patented Nov. 12, 1935

2,020,586

UNITED STATES PATENT OFFICE 2,020,586

ANTISKID DEVICE FOR WHEEL TREADS

Leon W. Stetson, Newton, Mass.

Application July 11, 1929, Serial No. 377,444
Renewed January 25, 1934

1 Claim. (Cl. 152—14)

The present invention relates to a new form of anti-skid device for motor vehicle tires, and more particularly to such a device employing the usual metal or rubber chains.

The purpose and object of the present invention are to provide a method of attaching non-skid chains to permit and facilitate removal and replacement for any cause whatsoever, and to maintain the chains in the desired operative relationship to the tire when mounted thereon. With this object in view, I propose to detachably connect individual cross chains or groups of such chains with the tire in such a manner that the chains cannot become disconnected or moved from a predetermined position circumferentially of the tire. Each chain or group of chains is connected with the tire independently of the other chains, and in such a manner that any individual chain may be easily removed and replaced when broken or worn without dismounting the complete chain assembly, or requiring, as is usual, a laborious operation for replacing any broken chain in the assembly.

Although my method of attaching results in a rigid and permanent mounting of the chain with respect to the tire and rim, nevertheless it does not require any special rim or tire construction, nor does it necessitate brackets or other mechanical appliances attached to the wheel in such a manner as to mar the appearance of the wheel and conceivably form projections which may be broken or damaged in use. In this respect my method of attachment differs entirely from certain previous methods in which the non-skid chains were attached to hooks or latches mounted on the wheel and forming a permanent part thereof.

Essentially my invention contemplates the employment of a flat metallic connecting band clamped between the bead of the tire and the opposing face of the rim when the tire is mounted upon the rim and inflated. This band projects outwardly beyond the rim and in close proximity to the tire, and is provided with a suitable form of latch for connecting a chain assembly thereto. In the simplest and most efficient form of the invention which I have yet devised, the band is provided with attachable connections at opposite ends, and conforms generally with the contour of the rim section lying between the tire and rim, and projecting outwardly at opposite sides of the rim for connection at the opposite ends of the individual cross chains or group of chains.

In the drawing illustrating the preferred form of the invention, Fig. 1 represents a section in elevation of a tire with my improved chain mounted thereon; Fig. 2 is a detail showing a partial side elevation of a tire with the chain mounting; and Fig. 3 is a detail illustrating a section in elevation of a modified form of the attachment for connecting the chain in operative relation to the tire.

The illustrated embodiment of the invention is shown in connection with a tire of the usual form, comprising a tire body portion 10, having annular flanges or beads 12, an inner tube 14, and a liner 16. The tire assembly is mounted within a split rim 18, and is adapted to be disengaged from the rim in the usual manner by collapsing the rim. Located between the tire and the rim and conforming generally to the cross-sectional contour of the rim is a flat metal band or ribbon 20 of insufficient thickness to interfere with the fit of the tire on the rim, but having sufficient strength to retain opposite ends of a cross-chain in operative relation to the tire about which the chain is wrapped. The opposite ends of the band extend outwardly beyond the rim and in proximity to the wall of the tire, and are provided with connecting loops or hooks 22 which may normally be closed by spring latches 24. As shown more particularly in Fig. 2, the connecting loops are elongated approximately the width of the band, and are adapted for use with a U-shaped link 26, the opposite ends of which are permanently connected with the individual cross chains 28 and 29, the two chains forming a group which is retained in operative relationship by a single connecting band.

It will be evident that with this construction the means for connecting the chains in operative relation to the tire are normally mounted within the rim, are retained in close proximity to the wall of the tire, and are free from unsightly projections, both when the chain is in use and when no chain is connected thereto. The metallic connecting band is sufficiently flexible to permit the necessary movements of the chain in use, and when the chain is not connected therewith, the centrifugal force, due to the rotation of the wheel, normally maintains the band closely adjacent the wall of the tire.

It will be evident to those skilled in the art that the number and spacing of the bands, and incidentally of the cross chains connected thereto, may be varied as desired, depending on the surface to which the chain is subjected. Ordinarily a smaller number of cross chains may be employed with this construction than are commonly used in the usual type of non-skid chain.

The clamping engagement between the connecting band and the adjacent tire and rim prevents circumferential movement of the band with relation to the tire, thus maintaining the initial spaced relation of the chains.

Obviously such a method of connection may be employed with rings having different contours, the band either being sufficiently flexible to be shaped to the contour of the rim through the pressure of the tire, or being initially formed to the shape of the rim depending upon the characteristics of the band which is employed.

An alternative form of connection which might be used under certain circumstances is illustrated in Fig. 3. In this form the metal band or connection has a portion 35 embedded within the bead 36 of the tire, this band projecting outwardly along the side of the tire and above the rim, and having a similar hook 38 and latch 40 for connection with the cross chain. Although under certain conditions such a form of connection may be preferable, nevertheless it does involve a special tire construction with a permanent embodiment of the chain connection therein, whereas the previously described form of connection may be attached to and detached from any tire and rim without permanent change in the tire or rim, thus permitting interchangeability of tires and rims, and removal of the bands during the season of the year when chains are not ordinarily employed.

I claim:—

The combination of a vehicle wheel rim, a tire mounted thereon, a series of connector members formed of flat flexible metallic ribbon engaged and clamped between the inflated tire and rim to remain permanently in position during inflation of the tire, each member having an outwardly extending hook portion located in proximity to the tire beyond the rim, separate and independent anti-skid devices extending about the tire and each having a link received within and detachably engaging the hook, and means for locking the link within the outwardly extending hook to permit the anti-skid devices to be individually applied and disengaged from the permanently located hooks without deflation of the tire and without possibility of disengagement during use.

LEON W. STETSON.